Jan. 29, 1952 C. N. HICKMAN 2,583,570
NOZZLE FOR ROCKET MOTORS
Filed June 28, 1945
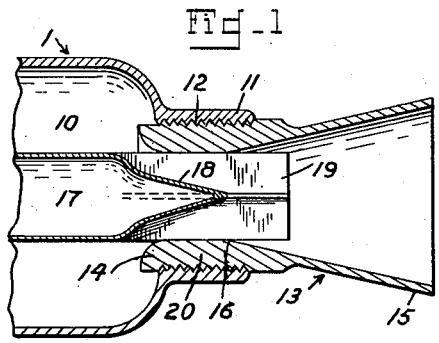
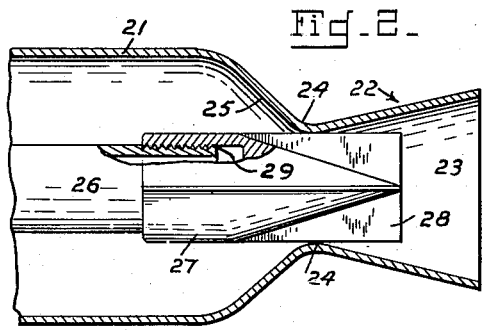
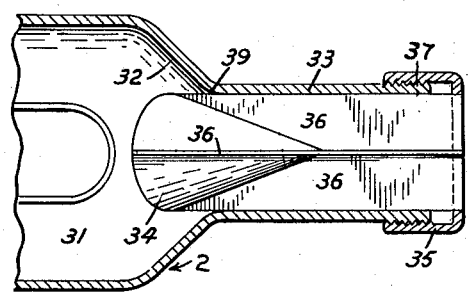
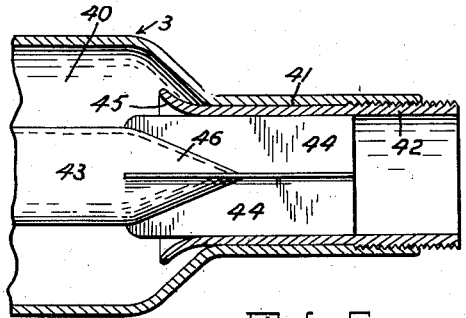
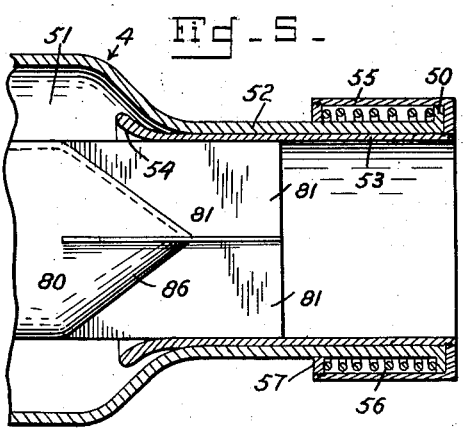
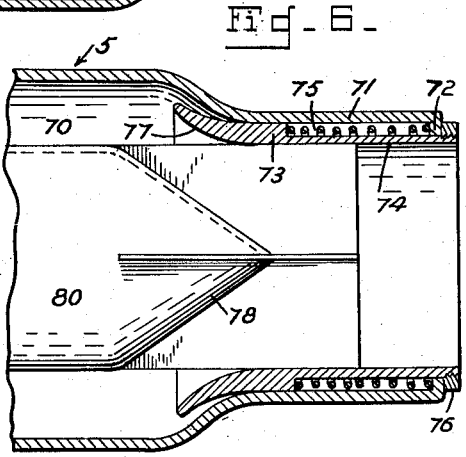
Inventor
Clarence N. Hickman
By C. E. Herrstrom & W. E. Thibodeau
Attorneys Patented Jan. 29, 1952

2,583,570

UNITED STATES PATENT OFFICE 2,583,570

NOZZLE FOR ROCKET MOTORS

Clarence N. Hickman, Jackson Heights, N. Y., assignor to the United States of America as represented by the Secretary of War Application June 28, 1945, Serial No. 602,141

9 Claims. (Cl. 102—49)

(Granted under the act of March 3, 1883, as amended April 30, 1928; 370 O. G. 757)

The invention described herein may be manufactured and used by or for the Government for governmental purposes without the payment to me of any royalty thereon.

This invention relates to rockets and more particularly to an adjustable nozzle for rockets.

A rocket motor consists essentially of a cylindrical chamber for containing a propellent composition which upon ignition and burning generates a hot gaseous fluid under pressure. This fluid, consisting of the combustion products of the propellent material, is discharged at a high velocity through a Venturi-like nozzle, located preferably at the rear of the motor chamber.

In order to obtain a high specific impulse for rapidly accelerated rockets a propellant having a high burning rate and high heat of explosion is preferred. This type of propellant is characterized by the fact that its burning rate is variable with temperature. This invention is concerned primarily with the problem of providing means compensating for the effect upon rocket performance of this change in burning rate of the propellant with changes in temperature.

The pressure of the fluid within a rocket motor is determined by the equilibrium between the rate at which the combustion products are formed and the rate at which they are ejected from the venturi. The rate of ejection of these combustion products is roughly proportional to the pressure within the motor chamber, and the rate at which they are formed depends upon the rate of burning of the propellant. This rate of burning is proportional to pressure and depends also upon the temperature of the propellant material.

The influence of ambient temperature upon the equilibrium pressure within a rocket motor causes the pressure to increase rapidly with ambient temperature.

The detrimental effects caused by temperature variations will be made more apparent by considering some design and operation factors affecting rockets. It is generally desirable to design a rocket with a minimum dead load and since it is the weight of the motor chamber that contributes chiefly to the dead load, the walls of the motor chamber are made just thick enough, allowing a reasonable factor of safety, to withstand the internal pressure at which the rocket is to operate. Now the optimum propellant loading which could be safely used at low temperatures would cause the motor chamber to rupture upon burning at high temperatures because of the increase in burning rate of the propellant at this high temperature. Consequently, in order to insure against the possibility of motor chamber rupture of these high temperatures, the surface of the propellant must be reduced or else the throat area of the nozzle must be increased. This reduction in surface area of propellant, or increase in nozzle throat, results also in a reduction in effective velocity and maximum range at the lower temperatures.

In designing rockets for different temperature ranges, different nozzles may be selected to shift the point of maximum effective discharge velocity of the combustion product relative to the temperature scale so that the maximum may occur at a relatively high, low, or intermediate temperature. In this invention it is proposed to utilize a nozzle having an adjustable throat so that the maximum effective discharge velocity and maximum range may be acquired at all temperatures within the operating limits with a single nozzle.

Since the pressure rises steeply with temperature it follows that the burning time of powder grains having a uniform web thickness will decrease as the temperature increases. This effect of temperature on burning time places further restrictions on the design and performance of rockets, particularly rapidly accelerated rockets. It has been discovered that the dispersion encountered in rockets increases as the third power of the burning time. Consequently, if a loading arrangement were to be designed to give the lowest possible dispersion at low temperature by raising the pressure level in the motor to shorten the burning time, the pressure developed at higher temperatures would be excessive, resulting in fracture of the motor chamber. To insure a reasonable maximum pressure over a specified temperature range, the pressure level must be reduced to such a value that the dispersion encountered at the lower temperatures is greatly increased. By virtue of this invention however it is possible to design a rocket which will have a minimum dispersion throughout the operating temperature range, and this dispersion will remain substantially constant irrespective of the temperature. Another advantage of the structure characterized by this invention is that regular burning of the propellant may be obtained at all operating temperatures. In the present design of rockets the propellant burns irregularly at very low temperatures because its burning rate at these temperatures is too low to cause a sufficient pressure to be built up within the chamber to sustain burning.

The specific nature of the invention as well as other objects and advantages thereof will clearly appear from a description of a preferred embodiment as shown in the accompanying drawing in which:

Fig. 1 is an enlarged elevational view in section of rocket motor having a Venturi-like nozzle with a manually adjustable throat.

Fig. 2 is an elevational view in section of a modification of Fig. 1.

Fig. 3 is an elevational view in section of a rocket motor having a straight cylindrical nozzle with a manually adjustable throat.

Fig. 4 is an elevational view in section of a modification of Fig. 3.

Fig. 5 is an elevational view in section of a rocket motor having a straight cylindrical nozzle with an automatically adjustable throat.

Fig. 6 is an elevational view in section of a modification of the rocket shown in Fig. 5.

In Fig. 1 of the drawings there is shown a hollow housing 1 defining a rocket motor combustion chamber 10 which has an inwardly flared end, leading to a constricted cylindrical flange portion 11. This flange portion 11 is internally threaded as at 12 to accommodate an adjustable nozzle 13. The interior of nozzle 13 is shaped to form a Venturi-like construction, being provided with front and rear portions 14 and 15, respectively, inwardly and outwardly flared to and from a constricted throat portion 16.

One end 18 of a burster tube 17 is conical in form and extends into the cylindrical flange portion 11. This end of the burster tube 17 is provided with four centralizing spiders 19, which are provided for accurately centering the tube within the throat opening to insure that the annular throat will be perfectly symmetrical. By adjusting the longitudinal position of the nozzle 13, relative to the conical end of the burster tube 17 by means of the threaded engagement therebetween, the effective cross-sectional area of the nozzle throat 16 may be varied to provide for an increase or decrease in the ratio of the burning surface of the propellant to the throat area of the Venturi, sufficient to compensate for temperature variations. Preferably a portion of threads 12 on the nozzle are milled smooth so that the temperature indications may be engraved thereon. In this manner the effective throat area may be easily and certainly adjusted in the field by rotation of nozzle 13.

In Fig. 2 there is disclosed a modification wherein a motor casing 21 and a Venturi nozzle 22 are integrally formed to provide an inwardly flared entrance 25, leading to a throat 24 of the nozzle and a rearwardly flared exit 23 for expanding the discharge gases. In this modification a burster tube 26 is terminated well forward of the throat 24 and has its outer cylindrical surface threaded to receive a conical shaped adapter 27. This adapter 27 is provided with centering fins 28 spaced about its periphery and a cylindrical recess 29 which is internally threaded so as to be adjustable on the burster tube 26 to vary the cross-sectional area of the annular jet formed by the outer surface of the adapter 27 and the nozzle throat 24.

Recent tests reveal that a rocket equipped with a cylindrical throat extension has a range and dispersion substantially equivalent to that obtained with a rocket motor having a flared venturi. Thus in accordance with this invention a rocket motor may be provided with a nozzle of adjustable throat area without the necessity of extending the burster tube to form an annular throat. The advantage in the modification, as illustrated in Fig. 3, is that an adjustment of the throat cross-sectional area may be obtained in those rockets not equipped with burster tubes. In Fig. 3 there is shown a hollow housing 2 defining motor chamber 31 having at its rear an inwardly flared entrance portion 32, leading to a hollow cylindrical section 33 having an interior 39 of reduced diameter. An adjustable cone 34 of streamlined configuration is secured to a support ring 35 by means of four centralizing spiders 36, opposite ends of which are welded to the tapered portion of the cone 34 and the support ring 35, respectively. Cone 34 thus defined an annular discharge passage in cooperation with housing 1. The ring 35 is provided with internal threads 37 and is adjustably positioned on the cylindrical extension 33 by virtue of its threaded engagement therewith, to provide longitudinal adjustment of the cone 34 relative to reduced diameter portion 39 to vary the cross-sectional area of the annular jet.

In Fig. 4 there is shown a further modification of a type of adjustable nozzle for use on a rocket motor employing a burster tube and having a cylindrical extension for the nozzle. As illustrated, a housing 3 defining motor chamber 40 is provided having a reduced-diameter cylindrical extension 41, which is internally threaded to receive a hollow externally threaded sleeve 42 having a forward outwardly flared portion 45. A burster tube 43 is provided with a conical end 46 which projects into the extension 41 and is provided also with centralizing vanes 44 spaced about its periphery. Adjustment of the area of the annular throat formed between the conical end 46 of the burster tube 43 and the outwardly flared portion 45 of the cylindrical sleeve 42 may be obtained by rotating the sleeve 42 within the cylindrical portion 41.

In each of the foregoing embodiments of this invention manual adjustment of the throat area has been provided. However, in the embodiment of this invention illustrated in Figs. 5 and 6, there is shown a rocket motor in which the throat area is adjusted automatically with pressure. Referring now to Fig. 5, a housing 4 defining a motor chamber 51 is provided with a reduced-diameter cylindrical extension 52, the rear end of which is provided with radially projecting annular flange 50. A sleeve 53 having an outwardly flared forward portion 54 is slidably supported within the cylindrical extension 52 and is secured to an annular member or housing 55 by being threaded thereto.

An annular discharge passage is defined between flared portion 54 and the end of a burster tube 80. Spaced fins 81 are suitably secured to the end of burster tube 80 for centralizing purposes.

A helical compression spring 56 is inserted within the space defined by the annular member 55 and the outer surface of the cylindrical extension 52 of the rocket. A ring 57 is threaded into the forward end of the annular member 55 to retain spring 56 under compression and to provide means for adjusting the spring compression to adjust the force required to move the sleeve 53 rearwardly within the cylindrical extension of the motor chamber. Spring 56 thus biases sleeve 53 forwardly to the position illustrated wherein the area of the annular discharge passage is a minimum.

In operation, the gas pressure developed within motor chamber 51 operates on the forward facing surfaces of sleeve 53, and particularly on the flared portion 54 thereof to produce a rearward force on such sleeve proportional to the gas pressure. Such rearward force is opposed by spring 56. By proper proportioning of spring 56 the resulting rearward movement of sleeve 53 and hence the area of the annular discharge passage may be controlled to maintain the pressure developed within motor chamber 51 substantially constant.

In the modification illustrated in Fig. 6, a cylindrical extension 71 of a housing 5 defining a motor chamber 70 is provided with an inwardly projecting flange 72 at the rear thereof. A hollow sleeve 73 is slidably inserted within extension 71 and has a forward outwardly flared portion 77 and a rear reduced diameter portion 74. A helical compression spring 75 is mounted within the annular recess defined between reduced diameter portion 74 of sleeve 73 and extension 71 and biases sleeve 73 forwardly. A flange 76 is suitably secured on the rear end of the adjustable sleeve 73 to retain the sleeve in the position illustrated wherein the area of the annular throat defined between flared end 77 of the sleeve 73 and a tapered portion 78 of a burster tube 80 is a minimum. The movement of the sleeve within the cylindrical extension and against the coiled compression spring is automatic with pressure variations within the motor combustion chamber and provides automatically for an increase in the throat area of the annular jet in the manner previously described in connection with the structure of Fig. 5.

I claim:

1. In combination, a rocket motor chamber adapted to contain a material combustible to generate a hot propellant fluid under pressure, said chamber having a forwardly flared passage leading to a constricted orifice, a tube supported longitudinally within said chamber and adapted to contain a high explosive for fragmenting said chamber, one end of said tube being conical and including spaced fin members and extending into said constricted orifice, a separately formed Venturi-like nozzle having a rearwardly flared exit passage extending from a constricted portion thereof, and means securing said nozzle to said chamber whereby said nozzle may be movable relative to said chamber to vary the cross-sectional area of the annular jet formed by the conical end of said tube and the constricted portion of said Venturi-like nozzle.

2. In combination, a rocket motor chamber adapted to contain a material combustible to generate a hot propellant fluid under pressure, said chamber having a constricted exit orifice for said fluid, a conical member including spaced fin members extending within said orifice in coaxial relation therewith and with its tip directed rearwardly to form an exhaust passage, and means for effecting relative movement between said member and said orifice for adjusting the cross-sectional area of said passage.

3. In combination, a rocket motor chamber adapted to contain a material combustible to generate a hot propellant gas under pressure, said chamber having a constricted exit orifice for said gas, a conical member having spaced fin members supported within said chamber to extend within said orifice in coaxial relation therewith and with its apex directed rearwardly, a sleeve having a flared forward end and an open rear end, said sleeve being supported within said motor chamber and adjacent said conical member to form with said member an annular exhaust passage for discharging said gas rearwardly, said sleeve being axially movable relative to said member to vary the cross-sectional area of said passage.

4. In combination, a rocket motor chamber adapted to contain a propellent material and having a restricted exit orifice at rear end thereof, a conical member having spaced fin members extending within said orifice to form an annular jet, a sleeve having a forwardly flared end positioned within said orifice and movable relative to said conical member for changing the cross-sectional area of said annular jet at its restricted portion, and means resiliently retaining said sleeve in a forward position within said orifice to form with said conical member an annular jet of minimum cross-sectional area, whereby the fluid pressure within said chamber applied to the end section of said sleeve will move said sleeve rearwardly against said resilient means to increase the cross-sectional area of said annular jet.

5. In a rocket, a motor chamber adapted to contain a propellent material combustible to generate hot propellent gas under pressure, said chamber having a constricted exhaust passage comprising a cylinder extending rearwardly from said chamber, said cylinder being open at its rear end, sleeve means slidably fitting within said cylinder and axially movable relatively thereto, said sleeve means having an outwardly flared forward end, and conical means including fin means fixed in said chamber and coacting with the flared end of said sleeve to change the effective cross sectional area of said exhaust passage in response to sliding of said sleeve as a result of changes in pressure of propellent gas within said chamber.

6. In combination, a rocket motor chamber adapted to contain a propellant material combustible to generate a hot propellent fluid under pressure, said chamber having the wall thereof flared forwardly to form an entrance passage for said fluid leading to a constricted throat, a rearwardly flared exit passage for said fluid leading from said throat, a conical member having fins extending therefrom supported to extend within said throat to form an annular jet, and means for adjusting the relative axial positions of said conical member and said throat.

7. In a rocket, a casing forming a motor chamber, first means forming a constricted rearwardly-directed exhaust passage from said chamber and having an open rear end, conical means including fin means within the forward end of said exhaust passage, said fin means maintaining said conical means in coaxial relation with said exhaust passage and means for effecting relative axial movement between said first means and said conical means.

8. In a rocket, casing forming a motor chamber having a constricted rearwardly-directed exhaust passage, a cone having fins extending therefrom and having a rearwardly-directed apex and mounted within the forward end of said exhaust passage in coaxial relation therewith, and means for effecting relative axial adjustment of said cone and passage to thereby vary the effective cross-sectional area of said exhaust passage.

9. In a rocket, a casing forming a motor chamber terminating in a rearwardly-directed constricted extension having an open rear end, a sleeve slidably fitting within said extension and having a flared forward end within said chamber, a cone having spaced fins and mounted to extend into the flared forward end of said sleeve in coaxial relation therewith and with its apex directed rearwardly, spring means between said extension and sleeve urging the latter into forward position in which said cone and sleeve form a gas passage of minimum area, and stop means between said extension and sleeve, limiting the forward movement of said sleeve.

CLARENCE N. HICKMAN.

REFERENCES CITED

The following references are of record in the file of this patent:

UNITED STATES PATENTS

| Number | Name | Date |
|---|---|---|
| 1,838,354 | Bauer | Dec. 29, 1931 |
| 1,901,852 | Stolfa et al. | Mar. 14, 1933 |
| 2,402,809 | Farr | June 25, 1946 |

FOREIGN PATENTS

| Number | Country | Date |
|---|---|---|
| 841,015 | France | Jan. 28, 1939 |
| 223,977 | Switzerland | Jan. 18, 1943 |